(12) United States Patent
McGrath

(10) Patent No.: US 6,533,329 B1
(45) Date of Patent: Mar. 18, 2003

(54) METHOD FOR MAKING A MOLDED EXPANSION JOINT SEAL

(75) Inventor: David F. McGrath, Garden Ridge, TX (US)

(73) Assignee: Senior Investments AG (CH)

( * ) Notice: Subject to any disclaimer, the term of this patent is extended or adjusted under 35 U.S.C. 154(b) by 0 days.

(21) Appl. No.: 09/607,235

(22) Filed: Jun. 30, 2000

(51) Int. Cl.⁷ .................................................. F16L 51/02
(52) U.S. Cl. ......................................... 285/229; 285/55
(58) Field of Search ........................... 285/229, 55, 46, 285/49, 236; 52/393; 264/120, 109; 65/443, 36; 100/35; 156/433

(56) References Cited

U.S. PATENT DOCUMENTS

| | | | | |
|---|---|---|---|---|
| 3,359,014 A | * | 12/1967 | Clements ..................... 285/55 |
| 3,552,776 A | * | 1/1971 | Leymann ................ 285/229 X |
| 4,186,949 A | * | 2/1980 | Bartha et al. ........... 285/226 X |
| 4,289,338 A | * | 9/1981 | Cook .......................... 285/229 |
| 4,648,934 A | * | 3/1987 | Kiss ............................ 156/433 |
| 4,732,413 A | * | 3/1988 | Bachmann et al. ........... 285/46 |
| 6,210,147 B1 | * | 4/2001 | Mori et al. ................. 425/384 |

* cited by examiner

Primary Examiner—Christopher P. Schwartz
Assistant Examiner—Melanie Torres
(74) Attorney, Agent, or Firm—Greenberg Traurig

(57) ABSTRACT

A method for forming sections of a flexible sealing belt, for expansion ducts is provided. A sheet of flexible sealing belt material is molded, using application of pressure and heat, to impart a desired contour to the belt section, to enable the belt, when installed in an expansion joint, to retain an outwardly extending shape, to resist collapse of the belt into the gap between the duct ends.

13 Claims, 3 Drawing Sheets

12
METHOD FOR MAKING A MOLDED EXPANSION JOINT SEAL

BACKGROUND OF THE INVENTION

1. Field of the Invention

The present invention is directed to constructions for expansion joints for ducting, for example, such as may be used for the exhaust for large stationary gas turbines for the generation of electrical power, and for other ducting environments, especially those involving high temperature.

The present invention is directed, in particular, to seals for such expansion joints and, more specifically, to a molded polytetrafluoroethylene (PTFE, e.g., sold under the mark Teflon®) expansion joint for providing continuous contact with a coated fiberglass belt.

2. Prior Art

Ducting which is used to transport air or other gaseous flows that are subject to high temperatures, typically must be provided with expansion joints that will enable the ducting to expand or contract to accommodate such dimensional variations as may be caused by extremes of temperature variation. Otherwise, the ducting might be subject to leakage or failure entirely.

One example of an environment in which such ducting is necessary is that of a stationary gas turbine that is used for electrical power generation. Expansion joints for ducting for gas turbines must be able to accommodate relative axial movements of the duct ends on opposite side of the joint, as well as relative vertical and/or horizontal movements of the duct ends.

A joint for use with ducting such as used in association with such moving air or other gaseous flow sources is typically formed by creating a gap in the ducting (which ducting typically may be round or rectangular in cross-section). Inner and outer liner duct structures are then affixed to the opposing duct ends. The inner and outer liner duct structures are in overlapping telescopic relation to one another, with the inner liner duct structures on the upstream side of the joint. In this way, the force of the gas flow, during ordinary operating conditions, has less of a tendency to drive the gases between the overlapping portions of the inner and outer liner duct structures. A relatively close fit between the overlapping portions is provided, so that the impact of high-magnitude pulsations or turbulent flow in the air or other gaseous fluid flow, on the remaining surrounding expansion joint structure, is reduced.

To the outside of the liner duct structure, a plurality of insulating pillows is arranged, to provide protection to the outer components of the expansion joint from flow pulsations and the heat of the gas flow, and generally to reduce heat loss through the joint. Typically, several layers of insulating pillows are used.

Finally, a high-temperature flexible belt is provided to create the flexible outer skin of the expansion joint, connecting the portions of the duct on opposite sides of the gap. It is this high-temperature flexible belt that provides the actual sealing of the joint that prevents escape of the air or other gaseous flow, and in addition, prevents the loss of pressure along the ducting.

Typically, the flexible belt is fabricated from polytetrafluoroethylene (PTFE, typically sold under the trademark Teflon®), that may or may not have an additional layer of fiberglass, for added strength. However, the belt is usually simply applied as a substantially flat belt that encircles the joint, and is affixed to the duct ends, for example, by a series of bolts or studs (which may or may not actually pass through the upstream and downstream edges of the belt), to which a supporting ring (or more likely, series of arcuate ring segments) is attached, that clamps the ends of the belt to the upstream and downstream duct ends.

This belt, though relatively stiff, is not absolutely rigid and has no preformed profile. The belt is typically constructed to have a certain amount of "slack" in the longitudinal direction, even when the expansion joint is at its design maximum extension. However, under certain flow and pressure conditions, and also depending upon the state of relative compression of the joint, a portion of the belt may collapse or be sucked into the gap, toward the centerline of the ducting, causing the belt to invert and fold over onto itself. Because the belt is relatively stiff and not significantly stretchable under normal operating conditions, the circumference of the belt remains essentially constant, so while one portion of the belt is sucked in, another portion bulges out (as shown in FIG. 1). Such an effect causes creases and folds in the belt, which, in turn, can create hot spots, accelerated degradation, and potential premature failure of the belt.

Accordingly, it would be desirable to provide a flexible sealing belt for ducting expansion joints that resists collapse and buckling, when the expansion joint is in an unloaded or compressive physical orientation, or when a negative pressure differential exists, which would tend to draw the flexible sealing belt into the gap between the opposing duct ends.

This and other desirable characteristics of the invention will become apparent, in view of the present specification, including claims, and drawings.

SUMMARY OF THE INVENTION

The present invention is directed, in part, to a process for molding a sealing belt section for an expansion joint comprising the steps of:

providing a first mold half, having a substantially concave inside region having a desired shape;

providing a second mold half, having a substantially convex outside region having a desired shape, the second mold half being operably configured to be substantially nestingly received by the first mold half;

placing a sheet of flexible sealing belt material between the first and second mold halves;

applying pressure to the mold halves, to force the sheet of flexible sealing belt material into the substantially concave inside region of the first mold half;

applying heat to the mold halves to, in turn, apply heat to the sheet of flexible sealing belt material;

holding the first and second mold halves together, once the first and second mold halves have been brought together to a desired proximity.

In a preferred embodiment of the invention, the step of placing a sheet of flexible sealing belt material further comprises the step of:

forming the sheet of flexible sealing belt material from a web of woven fiberglass material, and coating the web with PTFE.

The step of applying heat to the mold halves, preferably further comprises the step of:

placing heating elements against outwardly facing surfaces of the first and second mold halves.

The step of applying heat to the mold halves, preferably comprises the step of heating the mold halves to a temperature in the range of about 400°–680° F.

In a preferred embodiment of the invention, the method may further comprise the step of:
  applying insulation to the mold halves, to prevent loss of heat from the mold halves to ambient atmosphere.

The step of applying pressure to the mold halves preferably further comprises the steps of:
  placing the first mold half on a surface;
  placing the sheet of flexible sealing belt material atop the first mold half;
  clamping the sheet of flexible sealing belt material to the first mold half;
  placing the second mold half atop the sheet of flexible sealing belt material;
  placing a weight receiving frame on the second mold half; and
  placing one or more weights on the weight receiving frame.

In a preferred embodiment of the invention, the method may further comprise the step of:
  rocking the second mold half, to prompt movement of the sheet of flexible sealing belt material into the first mold half, as the sheet of flexible sealing belt material becomes heated.

The step of holding the first and second mold halves together preferably comprises the step of:
  clamping the mold halves together.

In a preferred embodiment of the invention, the method may further comprise the steps of:
  continuing to apply heat to the first and second mold halves, while the first and second mold halves are being held together.

In a preferred embodiment of the invention, the method may further comprise the steps of:
  ending application of heat after an amount of time in the range of about 1–2 hours;
  permitting the mold halves to cool;
  removing the molded sealing belt section, once the mold halves have cooled to a temperature in the range of about 200°–300° F.

The present invention is also directed, in part, to a sealing belt section for an expansion joint comprising a flexible sealing belt member, operably configured for peripherally surrounding at least a portion of the periphery of an expansion joint. The flexible sealing belt member is preferably fabricated from a sheet of at least one layer of flexible sealing belt material.

The flexible sealing belt member is preferably further provided with a pre-formed biased outwardly extending cross-sectional configuration, so that upon installation of the flexible sealing belt member into an expansion joint, connecting opposing duct ends, the flexible sealing belt member will be prompted to remain in an biased outwardly extending cross-sectional configuration, when the opposing duct ends of the expansion joint are brought toward one another.

DETAILED DESCRIPTION OF THE DRAWINGS

Figure 1:
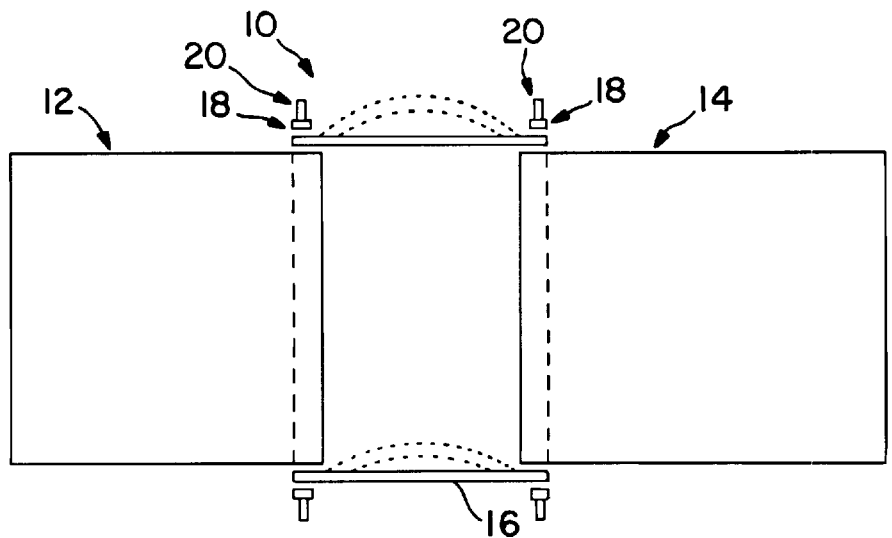
FIG. 1 is a simplified side elevation, in section, of a prior art expansion joint.

While this invention is susceptible of embodiment in many different forms, there is shown in the drawings and will be described herein in detail a specific embodiment, with the understanding that the present invention is to be considered as an exemplification of the principles of the invention and is not intended to limit the invention to the embodiment illustrated.

FIG. 1 is a side elevation, in section, simplified of a prior art expansion joint 10, for connecting two duct ends 12 and 14. Expansion joint 10 may include overlapping inner and outer duct liner structures (not shown), as well as one or more layers of insulation pillows (also not shown), such as are well known in the art of expansion joints for ducts for air or other gaseous flows, such as are employed, for example, in the ducting for a stationary gas turbine engine, such may be used for electrical power generation. Such duct liner structures and insulation pillows are well known to those of ordinary skill in the art of such expansion joints, and so extended discussion of them is not necessary for a complete understanding of the present invention, which is directed to a molded flexible sealing belt, and a method for making same.

Prior art expansion joint 10 typically has as a sealing member a simple circumferentially extending belt 16, which may be a continuous belt, or formed from a series of quarter-sections (or other suitable fractional segment) that are later joined. Belt 16 may have one or more layers, fabricated from Teflon, possibly with a reinforcing material, such as fiberglass belting.

Typically, belt 16, though stiff, is not absolutely rigid, and has no preformed profile. At rest, when joint 10 is in its neutral position, belt 16 would have a more or less flat profile, as shown in solid lines in FIG. 1. The ends of belt 16 are typically secured by circumferentially extending flanges 18, which may typically be formed by two or more arcuate segments. Flanges 18 may be secured in place by studs or bolts 20, which may or may not actually pass through belt 16.

Belt 16 is typically constructed to have a certain amount of "slack" in the longitudinal direction, even when the expansion joint is at its design maximum extension. However, under certain flow and pressure conditions, and also depending upon the state of relative compression of the joint, a portion of the belt may collapse or be sucked into the gap, toward the centerline of the ducting, causing the belt to invert and fold over onto itself. Because the belt is relatively stiff and not significantly stretchable under normal operating conditions, the circumference of the belt remains essentially constant, so while one portion of the belt is sucked in, another portion bulges out (as shown in FIG. 1). Such an effect causes creases and folds in the belt, which, in turn, can create hot spots, accelerated degradation, and potential premature failure of the belt.

Figure 2:
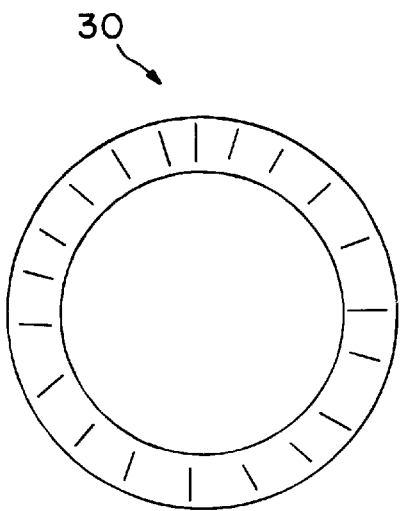
FIG. 2 is an end elevation of a flexible sealing belt, according to the principles of the present invention.
Figure 3:
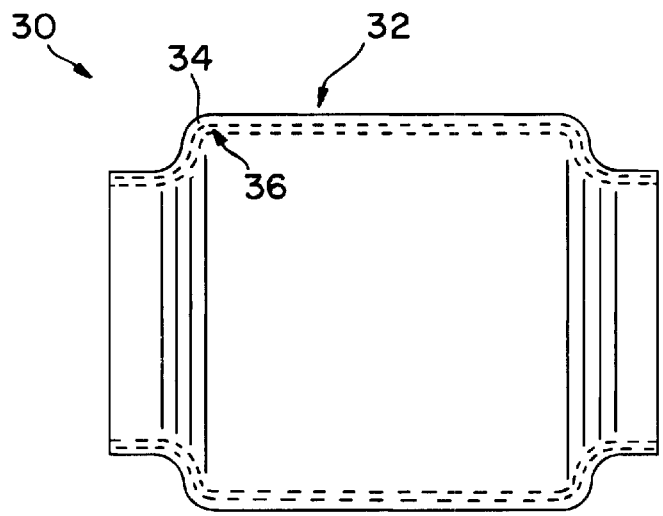
FIG. 3 is a side elevation of a flexible sealing belt, according to the principles of the present invention.

In order to address this, flexible sealing belt 30 of the present invention, shown in FIGS. 2 and 3, is provided with a non-flat side profile, that is pre-formed with a radially outwardly extending bulge. The particular profile shown in the figures is intended to be merely an example, and has been emphasized, for ease of illustration. It is to be understood that other profiles may be employed. In addition, while the sealing belt of the present invention is shown in the environment of an expansion joint that has a round cross-section, so that each sealing belt section is arcuate, expansion joints that are rectangular or other geometric cross-sections are known, so this invention could also be employed with sealing belt sections that are angled, instead of arcuate.

As indicated by the broken lines, belt 30 may be fabricated from a web of woven fiberglass material 36 that has been coated or impregnated with PTFE 34. The inside broken line indicates the inner surface of belt 30. In a preferred embodiment of the invention, a number of sections of woven fiberglass are oriented on the bias (i.e., the threads are at 45° angles to the longitudinal and transverse directions of the expansion joint) and joined to one another, to form a long, wide strip of web material. This web is then dipped into the PTFE, and then sintered or simply dried. After drying or cooling, then a further film layer of PTFE is applied to what will become the inside surface of the sealing belt. This film, which may be cast, extruded or skived, typically may have a thickness of 4–20 mils. After application of the inner seal layer of PTFE, an insulation layer of fiberglass may be applied, to the inside film. Other compositions and layer arrangements may be employed; however, in all preferred embodiments, PTFE will be a component of the belt structure.

Figure 4:
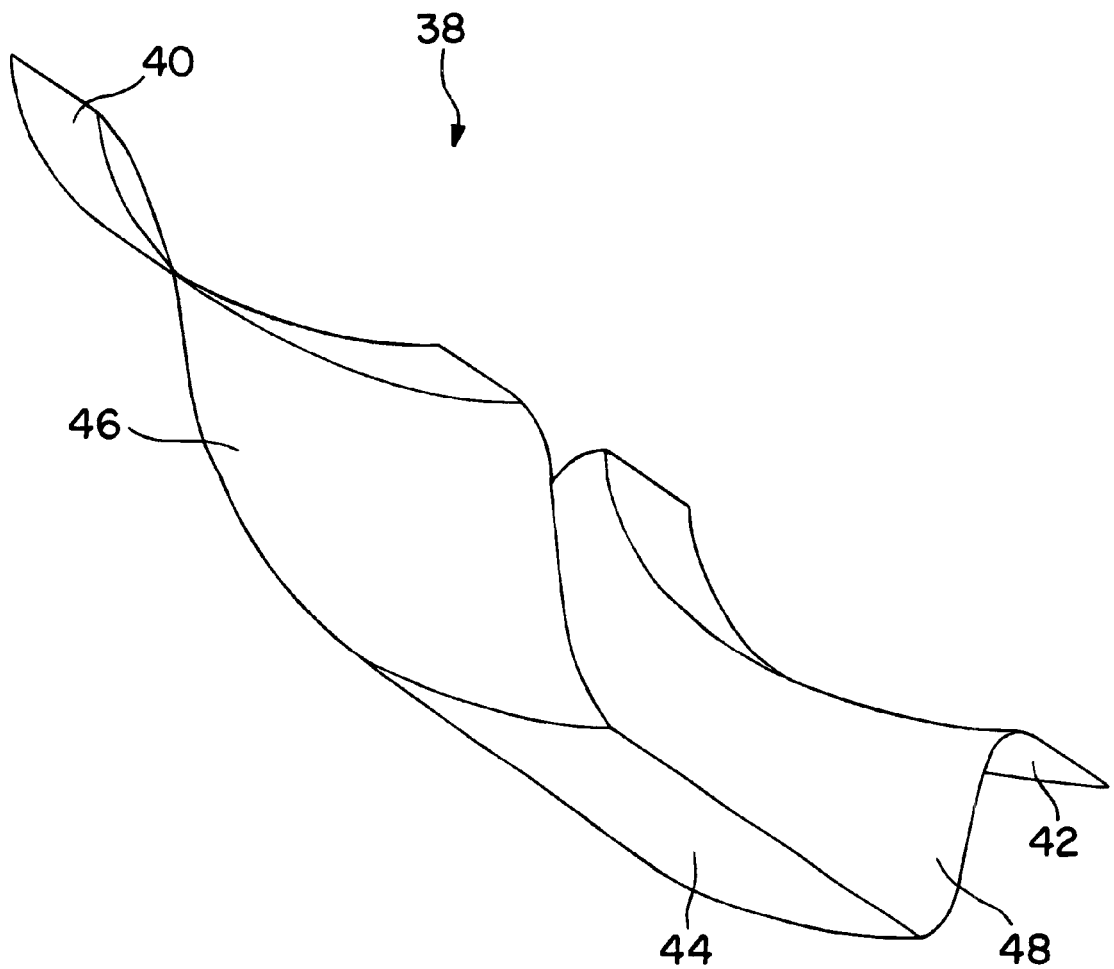
FIG. 4 is a simplified isometric view of an arcuate section of a flexible sealing belt, according to the principles of the present invention.

In a preferred embodiment of the invention, belt 30 will be formed as several arcuate sections, for ease of manufacture and installation. For example, such an arcuate section 38 is shown in FIG. 4. Section 38, shown in a highly simplified schematic form (i.e., without thickness), has transversely arcuate flanges 40, 42; a transversely arcuate well 44, and generally radially extending end walls 46, 48. While belt 30 may be molded, in several sections, in a preferred embodiment, these sections are all successively formed on a single large sheet of sealing belt material, as described above. In fact, the successive moldings may overlap slightly, so that eventually, a continuous curled belt member, comprising the complete circumference or periphery of the expansion joint is formed, that can be completed with only a single seam. It is known that PTFE can be "welded" to itself, using a variant, known in the art as PFA, so that ultimately a continuous hoop is formed. Typically, this hoop then has additional insulation added to its inside surface, in a continuous manner, prior to installation.

By providing each section 38 with a preformed outwardly extending profile, the completed belt 30 will have a contour that will resist collapse, when an expansion joint, provided with such a flexible sealing belt is unloaded or compressed. With a belt 30 having a preformed contour tending to keep the belt in a radially outwardly extending convex shape, the likelihood of collapse of the belt into the gap between duct ends, even under a slight negative pressure differential, is reduced.

Figure 5:
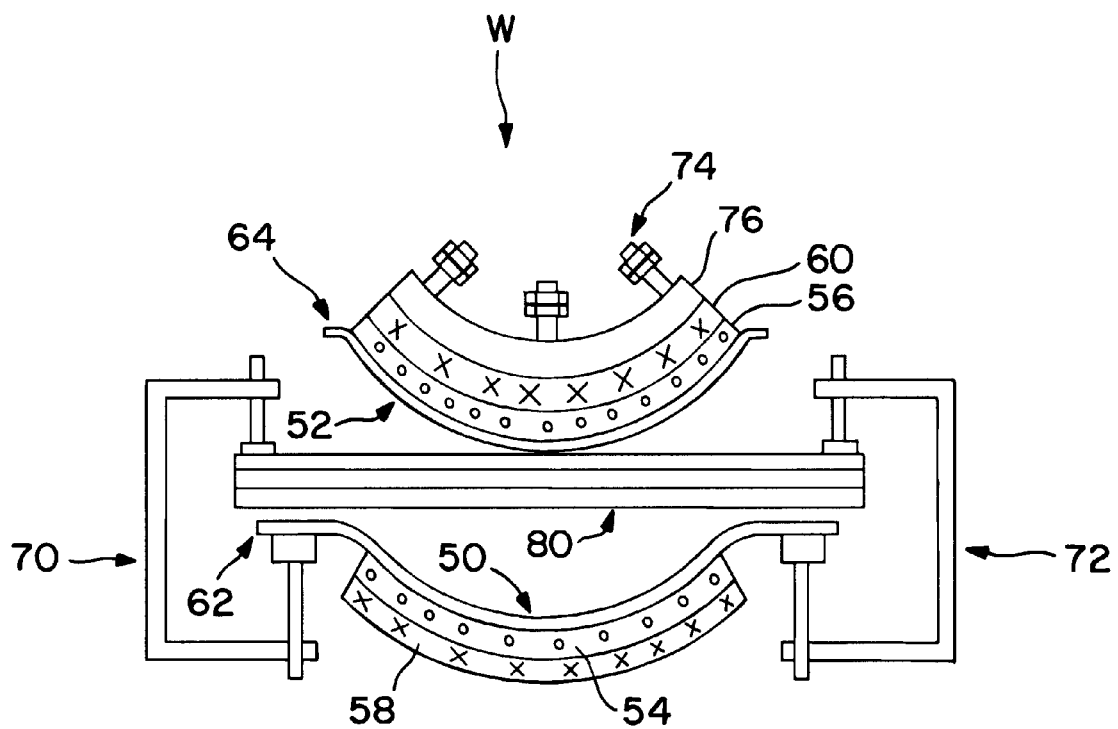
FIG. 5 is a highly schematic and simplified side section of a set-up for the molding process of the present invention.

Formation of section 38 is accomplished by means of a method described herein in association with FIG. 5. First, two mold halves, lower mold half 50, and upper mold half 52 (shown in side section in FIG. 5) are formed, preferably from a metal material of suitable strength and composition, to withstand gross forces on the order of several hundred pounds or more, and to withstand temperatures, for extended periods, of up to 700° F. or more. Halves 50, 52 will have inner and outer surfaces, respectively, that are essentially mirror images of one another.

On the outside surfaces of mold halves 50, 52, heating elements (e.g., electrical resistance heating elements) 54, 56 are affixed, surrounded by insulation bodies 58, 60. Heating elements 54, 56 will be connected in a suitable manner to a control device (not shown) that can control the rate at which heat is generated by the heating elements, and can monitor (i.e., regulate), using suitable known calibration techniques, the temperature of the belt material in the mold. While in a preferred embodiment of the invention, heating elements and insulation bodies are applied to both mold halves, in an alternative embodiment, a heating element and an insulation body may be applied to only one of the mold halves.

Mold half 50 preferably has a surrounding flange 62. Mold half 52 may or may not have a surrounding flange 64, that if present, will preferably be narrower than flange 62. Alternatively, while flange 62 may be continuous about the periphery of mold half 50, flange 64 may be more in the form of spaced tabs. The inside-facing surfaces of these flanges may act as mold surfaces, for forming the flanges of the belt sections.

During the initial molding process, as described herein, pressure may be applied simply by applying weight W to the upper mold half 52. For example, weights 74 may be placed on weight receiving structure 76, atop mold half 52, to ensure appropriate weight distribution towards the uniform application of weight.

The molding process begins by placing a large sheet 80 of flexible belt material on top of lower mold half 50. Sheet 80 may be fabricated as described hereinabove. Clamps, such as clamps 70, 72 ("sheet clamps") are preferably used to clamp sheet 80 to the lower mold half 50. A suitably configured frame (not shown) may be used to keep sheet 80 relatively taut and flat, and also serve to distribute the clamping force, as upper mold half 52 is placed atop sheet 80. Clamping of the sheet is important, in that it prevents the sheet as a whole from being drawn into the mold, and forces the material of the sheet to be stretched, at least locally, during the molding process. Weight is applied to upper mold half 52, which may be in the range of 200–500 pounds. Greater or lesser amounts of weight may be applied, depending upon various factors, such as the overall size of the belt section being formed, the size of the radii of curvature being formed by the molding process (smaller radii may require greater pressure), and the strength, stiffness or toughness of the particular belt materials being used.

Power is then applied to heating elements 54, 56. Insulation bodies 58, 60 serve to reduce the amount of heat loss, and help direct the heat from the heating elements into the mold halves. Once a suitable temperature has been attained, at which point the material of sheet 80 begins to "give", as pressure is applied to upper mold half 52, a rocking motion may be imparted to mold half 52, as it pushes sheet material 80 down into mold half 50. Like the pressures used, the temperature range for the molding process may vary in response to the factors described above. It is believed that the temperature range will be about 400°–680° F., although other temperatures may be used However, the molding temperatures typically will not go much higher, as the PTFE material begins to degrade and actually evaporate (sublimate) once the temperature exceeds approximately 700° F.

Once the material has been substantially pressed into the lower mold half 50, additional clamps ("mold clamps", not shown) may be used to clamp the upper and lower mold halves together. Once mold halves 50, 52 have been brought together as closely as desired, the clamps are given their final setting, and the set up is allowed to sit, with a constantly applied temperature in the described range, for 1–2 hours. After that, the heating current is cut off, and the mold is allowed to cool. Once the temperature has dropped to about 200–300° F., the molded section can be removed.

Once the sealing belt section has been removed from the mold, the edges are trimmed, as necessary. During installation, the several belt sections (however many as may be required), are positioned on the ends of the opposing duct ends, and also joined to one another along their adjoining longitudinal edges, using conventional seaming techniques, to create a continuous sealing belt.

Alternatively, the sheet of sealing belt material can be indexed relative to the mold apparatus, so that an adjacent portion of sheet can be molded, so as to form the continuous molded belt as described above.

It is believed that during the molding process, the material of the sheet 80 undergoes a thermo-mechanical-chemical process that actually alters the mechanical properties of the sheet material, particularly the PTFE, to impart a desired outwardly extending shape, and additional stiffness. The sheet typically will not have a uniform thickness, after molding, in that there will probably be localized stretching, particularly in the regions of curvature. The sheet will retain the outwardly extending shape, and tend to retain it, even after flexing during operation of the expansion joint. In this way, the kind of inward collapse that prior art flexible sealing belts are susceptible to is prevented.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

We claim:

1. A process for making a sealing belt section for an expansion joint comprising the steps of:
   providing a first mold half, having a substantially concave inside region having a desired shape;
   providing a second mold half, having a substantially convex outside region having a desired shape,
   the second mold half being operably configured to be substantially nestingly received by the first mold half;
   placing a sheet of flexible sealing belt material between the first and second mold halves;
   restraining regions of the sheet of flexible sealing belt material, at positions beyond the regions of the first and second mold halves, respectively;
   applying pressure to at least one of the mold halves, to deform the sheet of flexible sealing belt material so that the sheet of flexible sealing belt material is forced into the substantially concave inside region of the first mold half;
   applying heat to the mold halves to, in turn, apply heat to the sheet of flexible sealing belt material, while continuing to apply pressure to the mold halves, so that the mold halves continue to approach one another, to continue to deform the sheet of flexible sealing belt material, to stretch the sheet of flexible sealing belt material between said restrained regions beyond the concave inside and convex outside regions of the first and second mold halves;
   holding the first and second mold halves together, once the first and second mold halves have been brought together to a desired proximity,
   forming a plurality of complementary sealing belt members through the foregoing steps; and
   assembling the complementary sealing belt members into a flexible sealing belt section for an expansion joint, which is operably configured to resist inversion into an inwardly extending cross-sectional configuration, when pressure in an interior region of the expansion joint is less than atmospheric ambient pressure, exterior to the expansion joint.

2. The method according to claim 1, wherein the step of placing a sheet of flexible sealing belt material further comprises the step of:
   forming the sheet of flexible sealing belt material from a web of woven fiberglass material, and coating the web with PTFE.

3. The method according to claim 1, wherein the step of applying heat to the mold halves, further comprises the step of:
   placing heating elements against outwardly facing surfaces of the first and second mold halves.

4. The method according to claim 1, wherein the step of applying heat to the mold halves, comprises the step of heating the mold halves to a temperature in the range of about 400°–680° F.

5. The method according to claim 1, further comprising the step of:
   applying insulation to the mold halves, to prevent loss of heat from the mold halves to ambient atmosphere.

6. The method according to claim 1, wherein the step of holding the first and second mold halves together comprises the step of:
   clamping the mold halves together.

7. The method according to claim 1, further comprising the steps of:
   continuing to apply heat to the first and second mold halves, while the first and second mold halves are being held together.

8. A process for molding a sealing belt section for an expansion joint comprising the steps of:
   providing a first mold half, having a substantially concave inside region having a desired shape;
   providing a second mold half, having a substantially convex outside region having a desired shape,
   the second mold half being operably configured to be substantially nestingly received by the first mold half;
   placing a sheet of flexible sealing belt material between the first and second mold halves;
   applying pressure to the mold halves, to force the sheet of flexible sealing belt material into the substantially concave inside region of the first mold half;
   applying heat to the mold halves to, in turn, apply heat to the sheet of flexible sealing belt material;
   holding the first and second mold halves together, once the first and second mold halves have been brought together to a desired proximity;
   the step of applying pressure to the mold halves further comprising the steps of:
   lacing the first mold half on a surface;
   placing the sheet of flexible sealing belt material atop the first mold half;
   clamping the sheet of flexible sealing belt material to the first mold half;
   placing the second mold half atop the sheet of flexible sealing belt material;
   placing a weight receiving structure on the second mold half; and
   placing one or more weights on the weight receiving frame.

9. The method according to claim 8, further comprising the step of:

rocking the second mold half, to prompt movement of the sheet of flexible sealing belt material into the first mold half, as the sheet of flexible sealing belt material becomes heated.

10. A process for molding a sealing belt section for an expansion joint comprising the steps of:

providing a first mold half, having a substantially concave inside region having a desired shape;

providing a second mold half, having a substantially convex outside region having a desired shape, the second mold half being operably configured to be substantially nestingly received by the first mold half;

placing a sheet of flexible sealing belt material between the first and second mold halves;

applying pressure to the mold halves, to force the sheet of flexible sealing belt material into the substantially concave inside region of the first mold half;

applying heat to the mold halves to, in turn, apply heat to the sheet of flexible sealing belt material;

holding the first and second mold, halves together, once the first and second mold halves have been brought together to a desired proximity;

continuing to apply heat to the first and second mold halves, while the first and second mold halves are being held together;

ending application of heat after an amount of time in the range of about 1–2 hours;

permitting the mold halves to cool; and removing the molded sealing belt section, once the mold halves have cooled to a temperature in the range of about 200°–300° F.

11. A sealing belt section for an expansion joint comprising:

a flexible sealing belt member, operably configured for peripherally surrounding at least a portion of the periphery of an expansion joint, the flexible sealing belt member being fabricated from a sheet of at least one layer of flexible sealing belt material;

the flexible sealing belt member being further provided with a pre-formed biased outwardly extending cross-sectional configuration, so that upon installation of the flexible sealing belt member into an expansion joint, connecting opposing duct ends, the flexible sealing belt member will be prompted to remain in a biased outwardly extending cross-sectional configuration, when the opposing duct ends of the expansion joint are brought toward one another, the flexible sealing belt member being operably configured to resist inversion into an inwardly extending cross-sectional configuration, when pressure in an interior region of the expansion joint is less than atmospheric ambient pressure, exterior to the expansion joint.

12. A process for molding a sealing belt section for an expansion joint comprising the steps of:

providing a first mold half, having a substantially concave inside region having a desired shape;

providing a second mold half, having a substantially convex outside region having a desired shape, the second mold half being operably configured to be substantially nestingly received by the first mold half;

placing a sheet of flexible sealing belt material between the first and second mold halves, so that peripheral edge regions of the sheet of flexible sealing belt material extend beyond peripheral edge regions of both of the mold halves;

clamping the peripheral edge regions of the sheet of flexible sealing belt material, at positions beyond the peripheral edge regions of the first and second mold halves, respectively;

applying pressure to at least one of the mold halves, to deform the sheet of flexible sealing belt material so that the sheet of flexible sealing belt material is forced into the substantially concave inside region of the first mold half;

applying heat to the mold halves to, in turn, apply heat to the sheet of flexible sealing belt material, while continuing to apply pressure to the mold halves, so that the mold halves continue to approach one another, to continue to deform the sheet of flexible sealing belt material, to stretch the sheet of flexible sealing belt material between said restrained regions beyond the concave inside and convex outside regions of the first and second mold halves;

holding the first and second mold halves together, once the first and second mold halves have been brought together to a desired proximity.

13. A method for manufacturing a sealing belt section for an expansion joint comprising the steps of:

providing a flexible sealing belt member, operably configured for peripherally surrounding at least a portion of the periphery of an expansion joint, by fabricating the flexible sealing belt member from a sheet of at least one layer of flexible sealing belt material;

further providing the flexible sealing belt member with a pre-formed biased outwardly extending cross-sectional configuration, so that upon installation of the flexible sealing belt member into an expansion joint, connecting opposing duct ends, the flexible sealing belt member will be prompted to remain in a biased outwardly extending cross-sectional configuration, when the opposing duct ends of the expansion joint are brought toward one another, operably configuring the flexible sealing belt member to resist inversion into an inwardly extending cross-sectional configuration, when pressure in an interior region of the expansion joint is less than atmospheric ambient pressure, exterior to the expansion joint.

* * * * *